US006065498A

United States Patent [19]
Campau

[11] Patent Number: 6,065,498
[45] Date of Patent: May 23, 2000

[54] LIQUID FLOW CONTROL DEVICE

[75] Inventor: Daniel N. Campau, Grand Rapids, Mich.

[73] Assignee: Flow-Rite Controls, Ltd., Grands Rapids, Mich.

[21] Appl. No.: 09/018,518

[22] Filed: Feb. 4, 1998

[51] Int. Cl.[7] ..................... A01G 25/09
[52] U.S. Cl. ..................... 137/899; 137/810; 137/813
[58] Field of Search ..................... 137/808, 809, 137/810, 811, 812, 813

[56] References Cited

U.S. PATENT DOCUMENTS

| | | | |
|---|---|---|---|
| 4,091,716 | 5/1978 | Ryan | 137/810 |
| 4,542,775 | 9/1985 | Beck | 137/812 |
| 4,917,151 | 4/1990 | Blanchard et al. | 137/810 |

OTHER PUBLICATIONS

Brochure by Flow–Rite Controls, Ltd.: "Power Stream Aerator", 1997.
Brochure by Flow–Rite Controls, Ltd.: "Livewell Controls Systems", 1997.
Notes from a Boeing Company continuing–class in "Fluidics" given in 1967, 2 pages, 1997.
Mayer et al, "Vortex Devices," *Fluidics,* Humphrey et al, ed., Fluid Amplifier Assoc., Revised Ed. 1968, pp. 185–200, 1997.

*Primary Examiner*—A. Michael Chambers
*Attorney, Agent, or Firm*—Niro Scavone Haller & Niro

[57] ABSTRACT

A flow control device for providing variable resistance to liquid flow through a flow passageway. A cylindrical housing communicates with the passageway. The housing has a sidewall, and an inlet and an outlet each disposed at two ends. A vortex generator is located within the housing, and has a base spaced from the inlet end of the housing and an annular flow guide radially spaced from the housing sidewall. The flow guide includes a number of slots. Liquid enters the housing through the inlet and is directed outside the vortex generator and through the slots. This creates a vortex flow path within the generator as the liquid flows to the housing outlet, so that as the pressure of the liquid at the inlet increases the flow factor of the device decreases to reduce the liquid flow rate through the device at higher inlet pressures.

19 Claims, 6 Drawing Sheets

LIQUID FLOW CONTROL DEVICE

BACKGROUND OF THE INVENTION

The present invention generally relates to flow control devices and, more specifically, to liquid flow control devices for applications in which it is desired to reduce liquid flow at a disproportionate rate at higher pressures. While the preferred embodiment is described with regard to flow control between a reservoir and a livewell mounted on a boat, those of ordinary skill in the art will understand that the present invention has a much wider application, as further discussed below.

The terms "livewell" and "baitwell" are used in this disclosure interchangeably to describe either saltwater or freshwater boat-mounted holding tanks. The term "fresh water" as used below means water brought into the holding tank from outside the boat, whether saltwater or freshwater.

It is widely recognized that successful saltwater fishing with natural bait requires that the bait be kept alive and healthy. Since bait can be quite expensive and fragile, many fishing boats are equipped with means to maintain a continuous circulation of fresh water through the baitwell at all times, whether the boat is moving or not. In freshwater tournament fishing, such as bass and walleye events, the catch is kept in livewells. It is critical in these events to keep the catch alive or the fisherman will be penalized at weigh-in for any dead fish. Tournament catch are released after weigh-in.

A popular type of fishing boat livewell system is shown in FIG. 1. An inlet strainer or high-speed pickup 10 is mounted on boat hull 12, below waterline. The scoop may include a strainer to prevent the intake of waterborne solids. The scoop is connected to a seacock or shut-off valve 13. The outlet of the seacock is connected to the inlet side of pump 15. The pump outlet feeds water to livewell 17. Livewell 17 includes an overflow pipe 19.

When the boat is sitting still in the water or moving slowly, the pump is turned on to provide circulation. Water is drawn in through the inlet strainer and pumped to the livewell. Excess water is drained out overflow pipe 19, maintaining the livewell at a preset level and providing a continuous circulation of fresh water.

When the boat is underway, the pump is turned off and water flow is provided by the inlet strainer. As the boat speed increases, the water pressure acting at the inlet strainer increases due to the relative velocity between the boat and water. A substantial flow of fresh water can be provided in this manner. However, at high boat speeds, the resultant high dynamic pressure at the inlet strainer can produce excessively high pressure at the pump inlet and excessively high flow rate into the livewell. Both high pressure and high flow can cause problems, as now discussed.

Short pump service life is very common in this application. When high pressure acts on the inlet side of the pump, it can cause premature pump seal failure because low-cost marine centrifugal pumps have seals that are not designed for high pressure on the inlet side. Also, the high flow rate causes the pump impeller to rotate continuously, increasing seal wear and motor brush wear. As a result, many manufacturers choose to use expensive pumps which can better withstand the high inlet pressures and flows.

The high flow rates can create other problems. Unless the seacock is manually adjusted, the flow can exceed the overflow capacity, resulting in a flooded boat. Seacocks are generally not located in a convenient place to allow easy adjustment of flow. If the plumbing system has a fixed restriction so that no excess flow condition develops, then it is likely that the pump will be unable to provide adequate circulation when the boat is sitting still. Also, a restriction small enough for typical livewell applications, which may be about ¼ inch in diameter in some cases, can easily clog with waterborne debris. Alternatively, if the overflow is increased in size to meet the flow demand at the highest boat operating speeds, it adds unacceptable cost and bulk to the plumbing system.

Accordingly, it is an object of the present invention to provide a flow control device which automatically adjusts to environments creating a high inlet pressure so that adequate flow may be provided, such as by using an inexpensive pump, during periods of relatively low inlet pressure, e.g., when a boat is sitting still or moving slowly, while also limiting flow and pressure to an acceptable level during periods of high inlet pressure, e.g., such as when a boat is running at its highest speeds.

It is another object of the invention to provide a flow control device which minimizes pump seal pressure, reduces induced impeller rotation speed, lessens motor brush wear and assures that an overflow system capacity is not exceeded.

It is yet another object of the invention to provide a flow control device which can utilize relatively large flow path dimensions at all operating pressures and flow conditions, allowing it to pass some suspended solid matter without frequent maintenance.

It is still another object of the invention to provide a flow control device which does not require moving parts, so as to provide long, trouble-free service life, and which can be manufactured using materials suitable for use in saltwater and freshwater, and for below waterline installation in boats.

SUMMARY OF THE INVENTION

The present invention provides a solution which addresses the objects described above, which overcomes disadvantages of prior art flow control devices, and which provides advantages not found in such prior art devices.

The present invention is a flow control device for variably resisting the flow of a liquid through a flow passageway. A housing communicates with the passageway. The housing has two ends, a sidewall, and an inlet and an outlet. A vortex generator or flow control means is mounted within the housing, and has a base and an annular flow guide radially spaced from the housing sidewall. The annular flow guide includes at least one, and preferably a plurality, of slots. Liquid entering the housing via the inlet is directed to the outside of the generator and through the slots thereby creating a vortex flow path within the generator as the liquid flows to the housing outlet, such that as the pressure of the liquid at the inlet increases the flow factor of the device decreases to lower the rate of increase in the liquid flow rate.

In a preferred embodiment, the housing is cylindrical and each of the inlet and the outlet is generally centrally disposed on one of the housing ends. Also, while again not a requirement to practice the present invention, the base of the generator may be axially spaced from the inlet end of the housing and the annular flow guide may extend axially from the base to the outlet end of the housing. Preferably, the slots are tangentially oriented relative to the annular flow guide. Also, preferably, the base extends radially beyond the annular flow guide, forming an annular flange with a plurality of passages. In a particularly preferred embodiment, the slots in the annular flow guide are displaced circumferentially from the passages in the annular flange. The annular flange may include beveled edges to direct the liquid flow at least in part in a preselected circumferential direction. Preferably, the slots are uniformly and generally symmetrically spaced about the circumference of the annular flow guide. The vortex generator may be cup-shaped, or take other suitable geometric configurations, and may be mounted, e.g., coaxially within the housing. Preferably, the diameter of the annular flow guide is greater than either of the diameters of the inlet or the outlet.

The present invention provides a flow control device which includes no moving parts.

In another preferred embodiment, the present invention consists of an assembly for transferring a liquid from a first reservoir to a second reservoir. This assembly includes a pump and a flow control device disposed between the first and second reservoirs. The flow control device located upstream of the pump, and has an effective flow area sufficient that the pump can deliver its full capacity liquid flow rate from the first reservoir to the second reservoir without substantial pressure drop across the flow control device. The flow control device also has a vortex generator such that as the inlet pressure to the device increases, the flow factor of the device decreases to lower the rate of increase in the liquid flow rate. The pump, such as a centrifugal or other pump, and flow control device may be incorporated into a unitary structure, or combined using separate parts. In a particularly preferred embodiment, the assembly is mounted on a marine vehicle and the second reservoir is a livewell.

In another embodiment of the present invention, a variable resistance flow control device is used to reduce the flow of a liquid through a flow passageway. The flow control device includes an inlet, an outlet and a flow control means. The inlet and the outlet each communicate with both the flow passageway and with the flow control means. The flow control means automatically responds to the flow velocity of the liquid through the inlet, such that as the inlet flow velocity increases the flow factor of the flow control means decreases to lower the rate of increase in the liquid flow rate.

In still another embodiment of the present invention, a variable resistance flow control device is used to reduce the flow of a liquid through a flow passageway. The flow control device includes an inlet, an outlet and a flow control means. The inlet and the outlet each communicate with both the flow passageway and with the flow control means. The flow control means automatically responds to the pressure of the liquid at the inlet, such that as the inlet pressure increases the flow factor of the flow control means decreases to lower the rate of increase in the liquid flow rate.

BRIEF DESCRIPTION OF THE DRAWINGS

The novel features of the invention are set forth in the appended claims. However, the preferred embodiments of the invention, together with its further objects and attendant advantages, will be best understood by reference to the following description taken in conjunction with the accompanying drawings in which:

DETAILED DESCRIPTION OF THE PREFERRED EMBODIMENT

Figure 1:
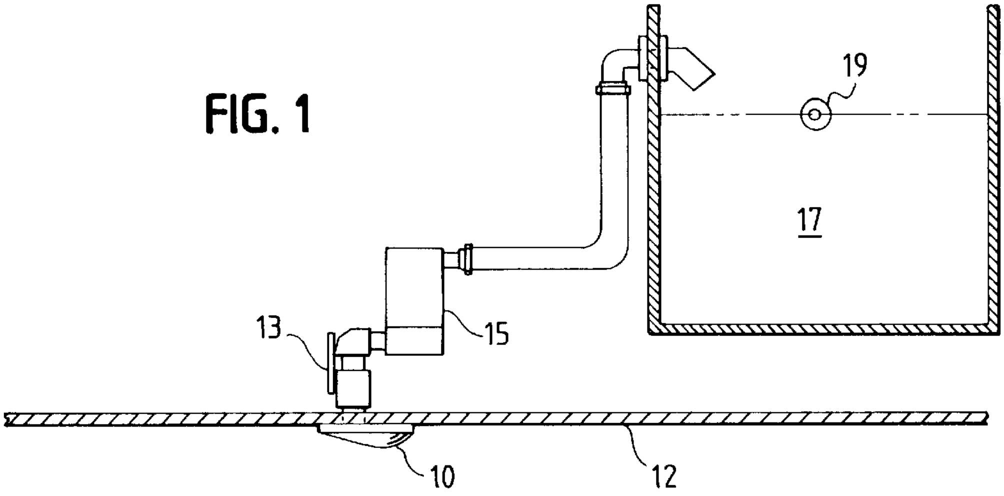
FIG. 1 is a diagrammatic view of a typical fishing boat livewell system.
Figure 2:
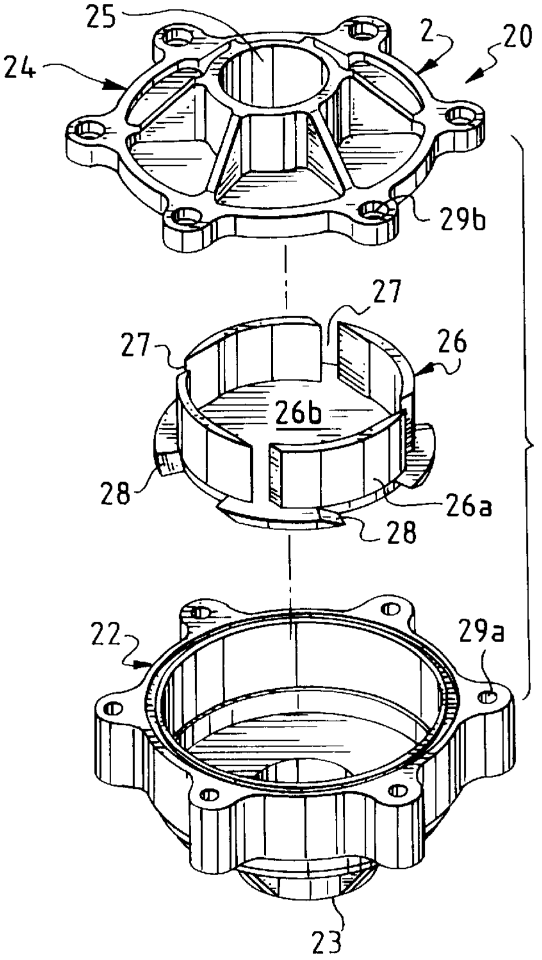
FIG. 2 is an exploded view of the vortex flow and pressure limiter which constitutes a particularly preferred embodiment of the flow control device of the present invention.
Figure 3:
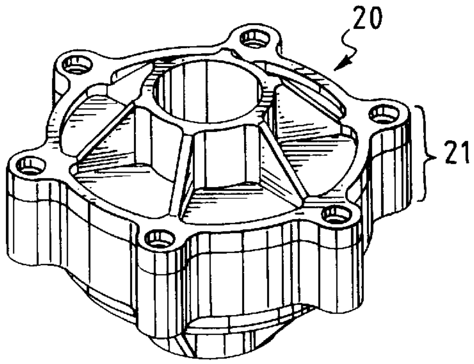
FIG. 3 is a view showing an assembly of the components of the flow control device of FIG. 2.
Figure 4:
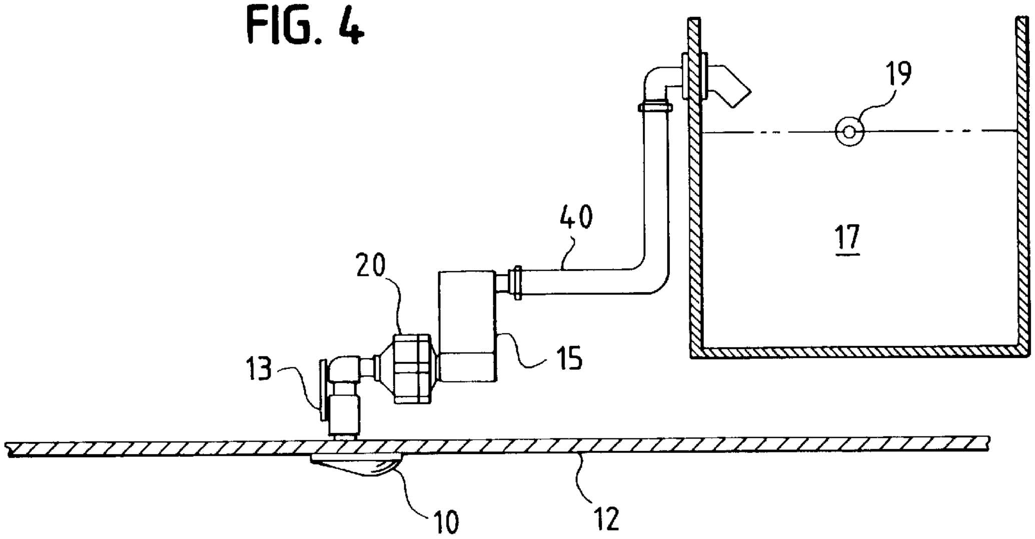
FIG. 4 is a schematic view of the flow control device used in a livewell application.

The flow control device of the present invention is generally referenced as 20 in the drawings. Referring to FIG. 4, flow control device 20 is mounted between the high speed pickup/inlet strainer 10 and the pump 15. Tube 40 transports liquid from the pump to the livewell 17. Referring now to FIGS. 2 and 3, in a preferred embodiment, flow control device 20 consists of two basic parts: a housing 21 and an annular flow guide 26. Housing 21 consists of base portion 22 and cover portion 24. Base portion 22 has an inlet opening 23 and is joined to a cover portion 24 which has an outlet opening 25. Base 22 and cover 24 house annular flow guide or "vortex generator" 26. An o-ring seal (not shown) is preferably provided between base 22 and cover 24, and housing attachment screws 43 (shown in FIG. 5) are inserted through apertures 29*a* and 29*b* to attach base 22 to cover 24. It will be understood that these basic parts of flow control device 20 can be provided as shown, or formed in one or two integral pieces, as convenient.

Figure 6:
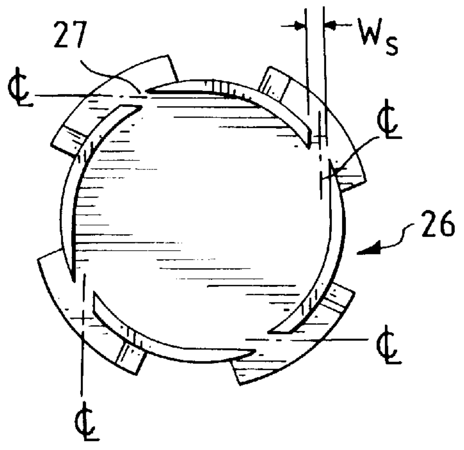
FIG. 6 is a planar view of the annular flow guide of the vortex generator which forms part of the flow control device of the present invention.

Annular flow guide 26 is preferably provided with a number of tangentially oriented slots 27 on annular wall 26*a* which run axially, relative to the axis of flow control device 20. Bottom portion 26*b* preferably extends radially beyond flow guide 26, forming an annular flange portion 31 having passages 33 which are displaced circumferentially from slots 27. Annular flange portion 31 preferably includes beveled edges 28 to direct liquid flow at least in part a preselected circumferential direction, as detailed below. Axial slots 27 and beveled edges 28 are each preferably generally symmetrically spaced around the perimeters of annular wall 26*a* and bottom portion 26*b*, respectively, of flow guide 26. Slots 27 and beveled edges 28 are also preferably beveled in the direction of flow, as shown in FIGS. 2 and 6, for reasons described below.

In operation, when flow is directed into inlet opening 23, the flow is conducted to the annular space between the base 22 and annular flow guide 26. Axial slots 27 then direct the flow into the interior of annular flow guide 26. A uniform spacing of the slots 27 around the perimeter of flow guide 26 is desirable to create a uniform circular flow pattern. Outlet opening 25 is preferably located at the center of cover 24, which is also preferably at the center of flow guide 26. In the embodiment shown in the drawings (see especially FIG. 5), flow guide 26 is seated within base 22 such that bottom 26*b* of flow guide 26 is located sufficiently above the upper surface of inlet opening 23 to allow adequate flow through inlet opening 23. [preferable that it is non-restrictive]

Under low flow conditions, the flow velocity is low and flow can easily move radially inward toward outlet opening 25 and, therefore, through flow control device 20 with little restriction. This is the condition occurring when, using the livewell example, a boat is sifting still and the pump is turned on. Water is easily drawn through flow control device 20 by pump 15. The total open area of slots 27 is established by providing sufficient flow area to satisfy the pump with minimal restriction. The number of slots 27, overall height of flow guide 26 and total area required determine the width of slots 27. Since flow control device 20 must not clog with waterborne debris, the width of slots 27 must be sufficient to pass solid matter likely to flow through inlet strainer 10.

Continuing with the livewell example, as boat speed increases, the pressure at inlet opening 23 of flow control device 20 increases. This causes the velocity of the water to increase as it flows through slots 27 in annular flow guide 26. Tangential flow components create a circular flow pattern which gives rise to an increase in centrifugal force or pressure which makes it increasingly difficult for the flow to move radially inward, toward the center of outlet opening 25. The faster the boat moves, the faster the circular flow in flow control device 20. The result is that the resistance to flow through flow control device 20 increases as boat speed increases.

Figure 9:
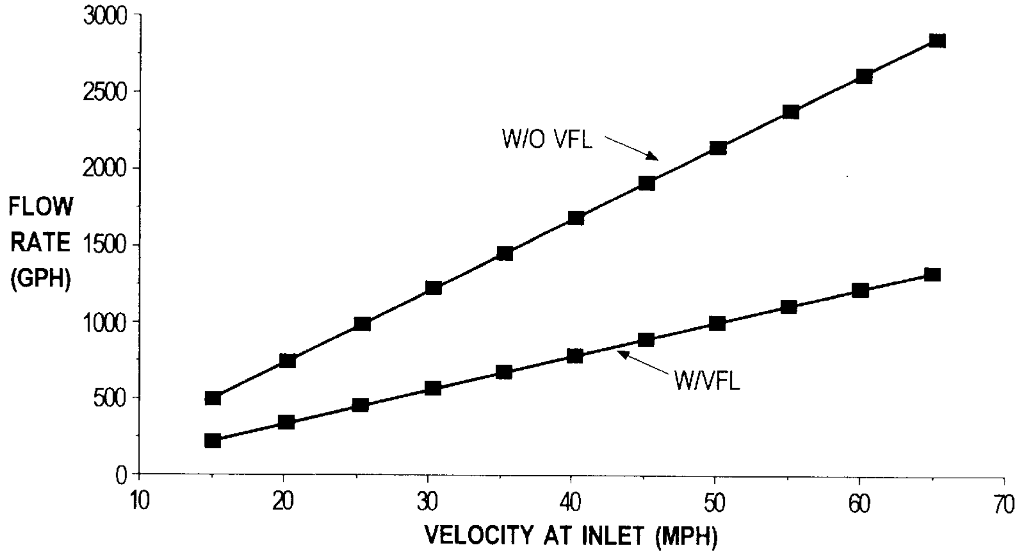
FIG. 9 is a graph showing flow rate versus inlet velocity for the prototype systems shown in FIGS. 7 and 8.
Figure 10:
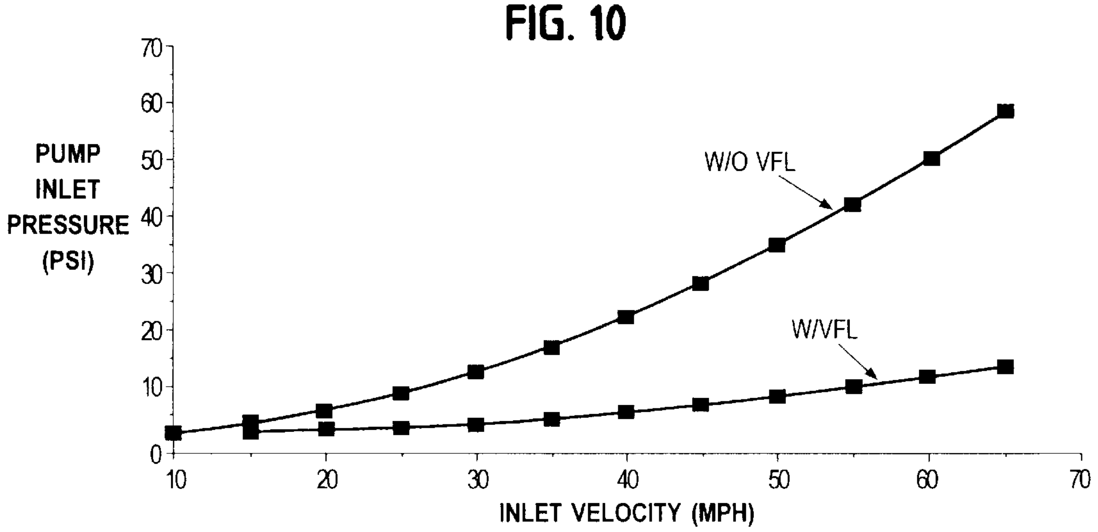
FIG. 10 is a graph showing pump inlet pressure ($P_{pi}$) versus inlet velocity ($V_b$) for the prototype systems shown in FIGS. 7 and 8.

As seen in FIGS. 9 and 10, the flow and pressure downstream of flow control device 20 at high boat speeds are significantly reduced. The dimensions of flow control device 20 can be set so that the characteristics of inlet pressure versus flow rate through the device meet the pump requirements at zero-to-low boat speeds, for example, while limiting the flow and pressure to desired maximum levels at the highest boat speeds.

Figure 5:
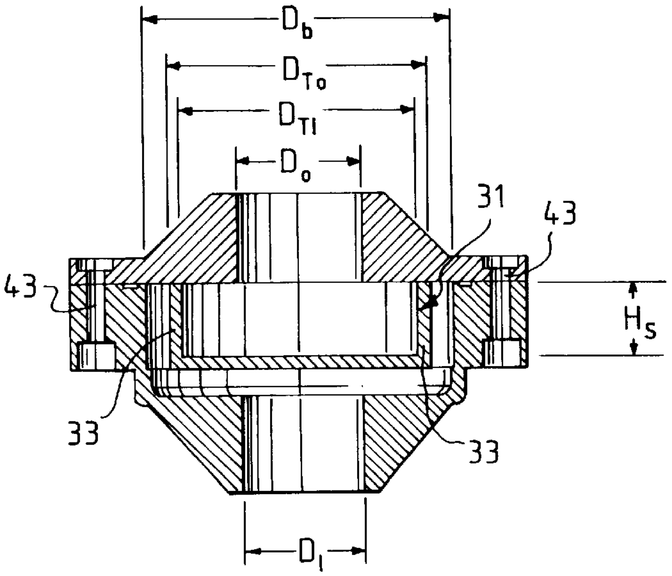
FIG. 5 is a cross-sectional view of a preferred embodiment of the flow control device of the present invention.

Referring to FIGS. 5 and 6, the key design parameters are:
Inlet diameter, $D_i$
Base diameter, $D_b$
Inside diameter of annular flow guide 26, $D_{Ti}$
Outside diameter of annular flow guide 26, $D_{To}$
Slot 27 height, $H_s$
Slot 27 width, $W_s$
Number of slots 27, $N_s$
Location of slots 27
Outlet Diameter, $D_o$ The resistance provided by flow control device 20 varies directly with $D_{Ti}$ and inversely with $D_i$, $W_s$, $H_s$ and $D_o$. It has been found that the most effective performance occurs when slots 27 are positioned at equal spacing around the perimeter of flow guide 26, but other locations may also be used to provide advantageous performance.

Figure 7:
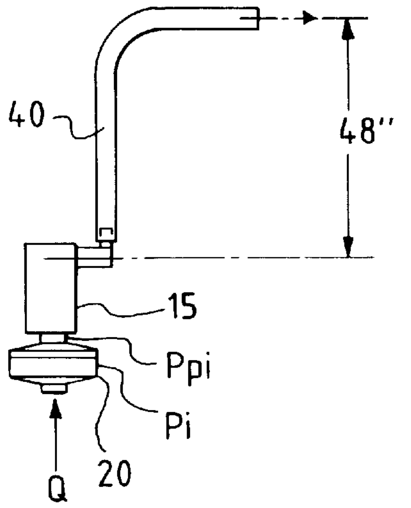
FIGS. 7 (with flow control device) and 8 (without flow control device) show different prototype test configurations.
Figure 8:
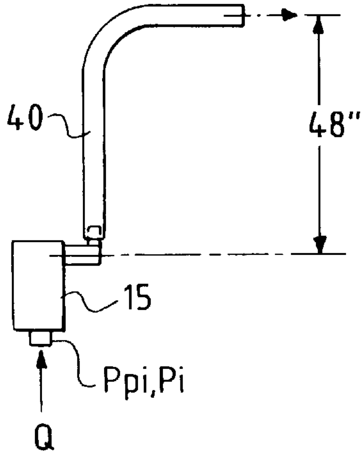

A prototype of flow control device 20 was built and tested at various inlet conditions. The dimensions chosen for this prototype were selected such that a 360 GPH (gallons/hour) pump could draw full flow through flow control device 20 when the boat was still, while at high speeds there would be a significant reduction in pressure and flow compared to the flow and pressure that would occur without the use of flow control device 20. The prototype test configuration is illustrated in FIG. 7. The system is typical of systems used in boats. The objective of the test was to determine how much flow control device 20 reduced the system flow rate and pressure at the pump inlet for a given boat velocity. The first measurements were made with flow control device 20 installed. Pressure upstream of device 20, $P_i$, pressure at the pump inlet, $P_{pi}$, and flow rate, Q, were measured at operating flow rates between 300 and 3000 GPH. Total inlet pressure, corresponding to the dynamic pressure produced by a moving boat, was measured upstream of device 20. The equivalent velocity at the high speed inlet was calculated from Bernoulli's equation:

$$\text{Total pressure due to boat velocity} = 1/2\rho V_b^2 = P_i + 1/2\rho V_s^2$$

where:

$V_b \equiv$ Velocity at high speed inlet $P_i \equiv$ Pressure at high speed inlet $V_s \equiv$ Velocity of flow where $P_i$ is measured ($V_s \cong 0$)

therefore:

$$V_b = \sqrt{(2P_i/\rho)}$$

The test measurements produced the flow rate versus inlet velocity characteristic and pump inlet pressure versus inlet velocity characteristic for the system using the vortex generator of the present invention. Flow control device 20 was then removed and the measurements were repeated. In this case the pump inlet pressure and the pressure at the high speed inlet are the same. The total pressure due to boat velocity is therefore:

Total pressure due to boat velocity=$\frac{1}{2}\rho V_b^2 = P_i + \frac{1}{2}\rho V_s^2$
where:

$V_b \equiv$ Velocity at high speed inlet $P_i \equiv$ Pressure at high speed inlet $V_s \equiv$ Velocity of flow where $P_i$ is measured.

Diameter of flow path = .75 in.

$$V_s = Q/A = Q/((\pi/4)(.75^2) = 2.264Q$$

therefore:

$$V_b = \sqrt{(2P_i/\rho) + V_s^2} = \sqrt{(2P_i/\rho) + (2.264Q)^2}$$

FIGS. 9 and 10 illustrate the benefits of flow control device 20 of the present invention. As boat speed increases, flow control device 20 reduces both flow rate and pump inlet pressure, compared to the values that would be present if device 20 were not used. As shown, at low boat speed, device 20 has little effect on either flow rate or pump inlet pressure, which is desirable to allow the pump to draw water freely through the high speed inlet. At higher boat speeds, however, the effect of flow control device 20 on both flow rate and pump inlet pressure becomes increasingly greater, which is again desirable to reduce the undesirable effects of excessive flow rate and inlet pressure on the pump and the livewell. For example, as shown in FIG. 9, at boat speeds of about 65 mph, the presence of flow control device reduces the flow rate by a fraction of near one half.

Figure 11A:
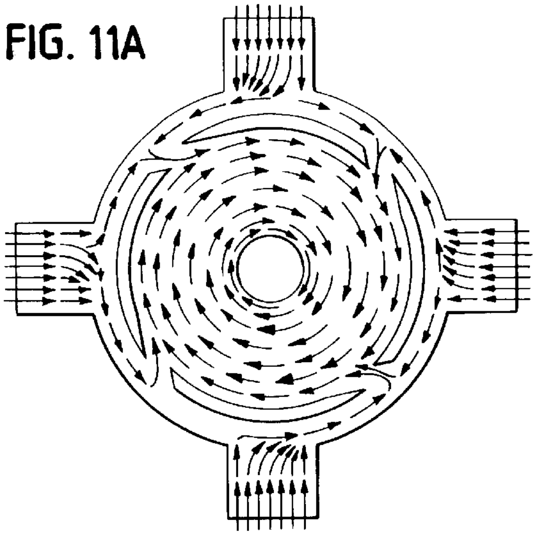
FIGS. 11A and 11B are 2-dimensional illustrations of the prototype test configurations shown in FIGS. 7 and 8, using computational fluid dynamic software to show the analytical flow patterns in vector (FIG. 11A) and gradient (FIG. 11B) form which are developed when the slots of the annular flow guide are tangentially oriented, causing the flow to spin around the centrally-located outlet.
Figure 11B:
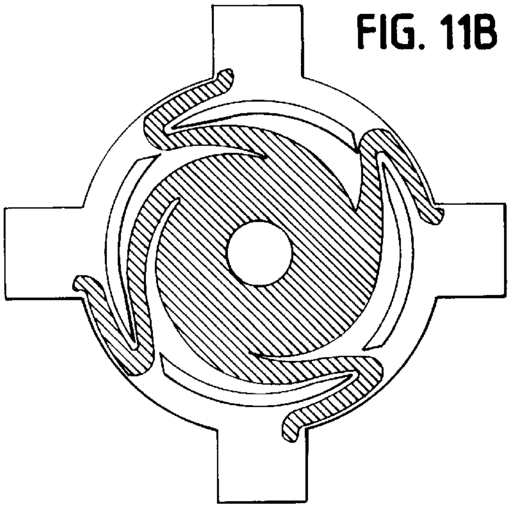
Figure 12A:
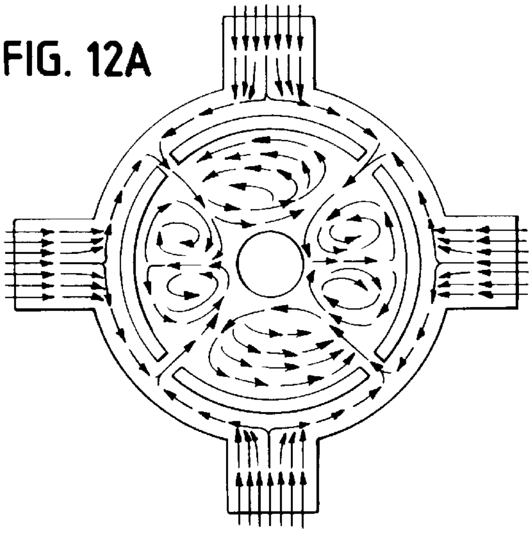
FIGS. 12A and 12B are illustrations similar to FIGS. 11A and 11B using computational fluid dynamic software, of the analytical flow patterns developed when the slots of the annular flow guide are radially oriented, allowing the flow to move directly toward the outlet with a minimal component of rotational velocity.
Figure 12B:
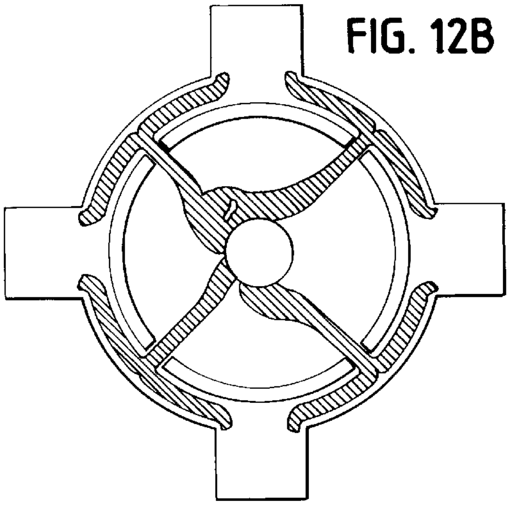
Figure 13:
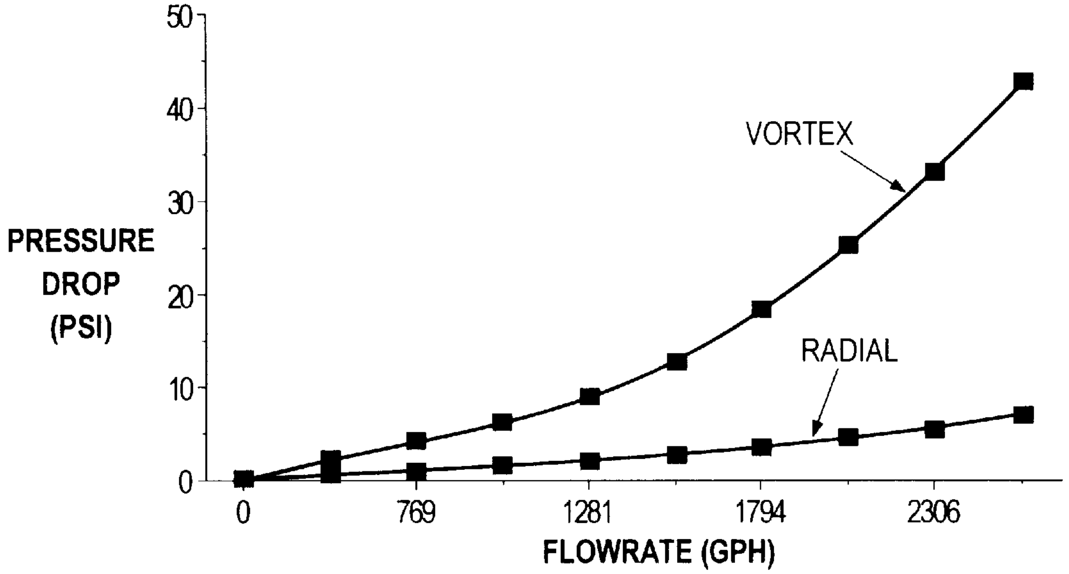
FIG. 13 is a graph comparing the pressure drop versus flow rate for the radial and tangential/"vortex" slot configurations, showing that as flow rate increases, an increasing pressure drop difference develops with the tangential slot configuration, providing increased flow resistance.

Using computational fluid dynamic software, an analysis was conducted to compare the performance of a tangential flow guide with a radial flow guide. The models were two dimensional representations of the prototype configuration. The only difference between the models was that the slots were oriented tangentially in one model (FIGS. 11A and 11B) and radially in the other (FIGS. 12A and 12B). These figures illustrate the analytical flow patterns which develop at the same high inlet velocity in each model. As shown, tangentially oriented slots 27 (as also shown, for example, in FIG. 6) cause the flow to spin around the centrally located outlet, while radially oriented slots 27 allow the flow to move directly toward the outlet with a minimal rotational velocity component. This difference in flow pattern results in a significant difference in flow rate versus pressure drop characteristic between the two configurations. FIG. 13 compares the pressure drop versus flow rate characteristic of the tangentially oriented and radially oriented slot 27 configurations. When flow rate is low, there is little pressure drop difference between radially and tangentially oriented slot configurations, but as flow rate increases an increasing pressure drop difference develops with the tangentially oriented slot configuration, providing increased flow resistance.

This means that device 20 has an increasing resistance to flow as boat velocity increases, which protects pump seals and reduces overflow capacity requirements. This lowers the cost of livewell system manufacturing since lower cost pumps and smaller overflow systems can be used. Pump life is extended. Operation is simplified also since device 20 automatically adjusts flow resistance with boat speed, eliminating the need for inconvenient manual seacock adjustments.

As used here and in the claims, the term "tangentially oriented" as it references slots 27 is defined as an arrangement and/or configuration of the slots such that flow exiting the slots tends to move circumferentially around the inside of annular wall 26*a* of flow guide 26 before traversing radially to outlet 25. The slots need not be oriented or the material between the slots need not be beveled at a true "tangent", but the orientation of the slots does at least form an oblique angle, relative to annular wall 26*a*, sufficient to cause circular flow.

As further used here and in the claims, "flow factor" means as follows. For typical orifice flow, which includes flow through round and slotted openings, $Q=C_f*\sqrt{\Delta\rho}$ where "Q" is flowrate, "$\Delta\rho$" is the pressure drop across the orifice, and "$C_f$" is called the flow factor. For specific fluids and orifice geometries, $C_f$ is generally a constant since the flow pattern in the range of interest (usually the turbulent flow regime) through these devices remains similar even with changes in velocity. The flow control device of the present invention has a similar characteristic equation relating flow rate and pressure drop, but $C_f$ is not constant in the range of interest which is, again, turbulent flow. Instead, $C_f$ varies for flow control device 20 due to the changes in the flow pattern within vortex generator 26. At low flow rates in which flow is generally radial through the vortex chamber, $C_f$ remains generally constant as with simple orifice devices. However, at high flow rates, flow is generally tangential, with high centrifugal forces which add to the flow resistance, reducing $C_f$. Thus, as the pressure a the inlet to device 20 increases, the flow factor decreases and, as a result, the rate of increase in the liquid flow rate through the device decreases.

Regarding the pump and/or livewell application described here, other configurations for flow control device 20 are contemplated. For example, device 20 may be built directly into the pump inlet chamber, conserving room in small bilges. The parameters for device 20, identified above, could easily be set for any pump capacity. Alternatively, device 20 may be incorporated into the high speed pickup, again reducing the installation space needed in the bilge.

The preferred embodiment has been described with reference to the drawings, in which the base of flow control device 20 is axially spaced from housing 21, and flow guide 26 extends axially spaced from housing 21, and flow guide 26 extends axially from base 22 and inlet 23 to cover 24 and outlet 25 so that the inlet and outlet liquid flow is colinear or parallel. However, it will be understood that this need not be the case. For example, for a given application the outlet passageway of flow control device 20 might run perpendicular or at another angle to the inlet passageway.

It will be understood that flow control device 20 may also find advantageous use in applications other than livewells. For example, flow control device 20 could be used in many different applications requiring flow limiters or system protection devices, where it is desired to minimize the effect of upstream pressure variations or downstream load variations on either pressure or flowrate. As one non-limiting example, the flow control device of the present invention could be used as a system protector in a hydraulic circuit, such that if a sudden load were placed on a hydraulic cylinder or a line failed, the vortex device would prevent an excess fluid condition from developing.

Of course, it should be understood that various changes and modifications to the preferred embodiments described herein will be apparent to those skilled in the art. Such modifications and changes can be made to the illustrated embodiments without departing from the spirit and cope of the present invention, and without diminishing the attendant advantages. It is, therefore, intended that such changes and modifications be covered by the following claims.

I claim:

1. A flow control device for variably resisting the flow of a liquid through a flow passageway, comprising:

a housing in communication with the passageway, the housing having two ends, a sidewall, and an inlet and an outlet, the fluid pathway between the inlet and the outlet defining a predetermined flow direction;

a vortex generator mounting within the housing, the generator having a base and an annular flow guide radially spaced from the housing sidewall, the annular flow guide including at least one slot;

whereby liquid entering the housing via the inlet is directed to the outside of the generator and through the at least one slot, thereby creating a vortex flow path within the generator as the liquid flows to the housing outlet, such that as the pressure of the liquid at the inlet increases the flow factor of the device decreases to lower the rate of increase in the liquid flow rate through the device and along generally the same predetermined flow direction.

2. The flow control device of claim 1, wherein the annular flow guide includes a plurality of slots.

3. The flow control device of claim 1, wherein the housing is cylindrical and each of the inlet and the outlet is generally centrally disposed on one of the housing ends.

4. The flow control device of claim 1, wherein the base of the generator is axially spaced from the inlet end of the housing and the annular flow guide extends axially from the base to the outlet end of the housing.

5. The flow control device of claim 1, wherein the at least one slot is tangentially oriented relative to the annular flow guide.

6. The flow control device of claim 2, wherein the base extends radially beyond the annular flow guide, forming an annular flange with a plurality of passages.

7. The flow control device of claim 6, wherein the slots in the annular flow guide are displaced circumferentially from the passages in the annular flange.

8. The flow control device of claim 6, wherein the annular flange includes beveled edges to direct the liquid flow at least in part in a preselected circumferential direction.

9. The flow control device of claim 1, wherein the slots are uniformly spaced about the circumference of the annular flow guide.

10. The flow control device of claim 1, wherein the vortex generator is cup-shaped.

11. The flow control device of claim 1, wherein the vortex generator is mounted coaxially within the housing.

12. The flow control device of claim 1, wherein the diameter of the annular flow guide is greater than either of the diameters of the inlet or the outlet.

13. The flow control device of claim 1, wherein the slots are disposed generally symmetrically about the circumference of the annular flow guide.

14. The flow control device of claim 1, wherein the flow control device includes no moving parts.

15. An assembly for transferring a liquid from a first reservoir to a second reservoir, comprising:

a pump and a flow control device disposed between the first and second reservoirs, with the flow control device located upstream of the pump;

the flow control device having an inlet and an outlet, and a fluid pathway between the inlet and the outlet defining a predetermined flow direction, wherein the effective flow area is sufficient such that the pump can deliver its full capacity liquid flow rate from the first reservoir to the second reservoir without substantial pressure drop across the device; and the flow control device also having a vortex generator such that as the inlet pressure to the device increases, the flow factor of the device decreases to lower the rate of increase in the liquid flow rate through the device and along generally the same predetermined flow direction.

16. The assembly of claim 15, wherein the pump and the flow control device are incorporated into a unitary structure.

17. The assembly of claim 15, wherein the assembly is mounted on a marine vehicle and the second reservoir comprises a livewell.

18. The assembly of claim 15, wherein the pump comprises a centrifugal pump.

19. A variable resistance flow control device for reducing the flow of a liquid through a flow passageway having a predetermined flow direction, comprising:

an inlet, an outlet and a flow control means, the inlet and the outlet each communicating with both the flow passageway and with the flow control means; and the flow control means automatically responding to the flow velocity of the liquid through the inlet, such that as the inlet flow velocity increases the flow factor of the control means decreases to lower the rate of increase in the liquid flow rate through the device and along generally the same predetermined flow direction.

* * * * *